April 15, 1969  J. L. FRITCH  3,438,656
PRESSURE CAN VALVE CLAMP

Filed May 19, 1967

INVENTOR.
JUNIOR L. FRITCH
BY
Burton & Parker
ATTORNEYS

April 15, 1969 J. L. FRITCH 3,438,656
PRESSURE CAN VALVE CLAMP

Filed May 19, 1967 Sheet 2 of 2

INVENTOR.
JUNIOR L. FRITCH
BY
Burton & Parker
ATTORNEYS

# United States Patent Office 3,438,656
Patented Apr. 15, 1969

3,438,656
PRESSURE CAN VALVE CLAMP
Junior L. Fritch, Edgerton, Ohio, assignor to Robinair Manufacturing Corporation, Montpelier, Ohio, a corporation of Ohio
Filed May 19, 1967, Ser. No. 639,835
Int. Cl. F16l 55/00, 37/26
U.S. Cl. 285—178                                                              7 Claims

ABSTRACT OF THE DISCLOSURE

This disclosure relates to a valve assembly and clamp adapted to be received on the radial lip of a container, such as a pressure can for Freon or other gases. The assembly includes a clamp having a skirt portion receivable beneath the container lip and an eccentrically mounted cam lever swingable to be received beneath the container lip opposite the skirt portion.

---

The clamp means and valve assemblies shown by the prior art are not satisfactory for the particular use intended for the clamp and valve assembly of this invention. The assembly of this invention is particularly, although not exclusively adapted to provide a sealed communication with a pressure container, such as commercial refrigerant cans, and is adapted to seal the container after it is tapped to permit partial usage thereof.

The clamps shown by the prior art generally do not provide a positive lock or seal, which is necessary for pressurized containers, or are expensive to manufacture. Another problem with the prior art clamps involves the assembly of the clamp to the container, because many of the clamps utilize screw threads or threaded nuts which are time consuming to assemble and which are subject to leakage or fracture.

Examples of clamps and valve assemblies shown by the prior art are as follows: 1,761,157, 1,920,524, 2,069,-216, 2,565,269, 2,770,474 and 3,155,402. United States Patents 2,069,216 and 2,565,269 illustrate the most common form of eccentric cam locking clamp shown by the prior art, however this form of cam lever is subject to binding and may be difficult to remove.

Briefly, the valve assembly and clamp of this invention relates to a clamp and a valve assembly. The clamp includes a body portion having means for engaging beneath the lip of the container and a clamp lever eccentrically mounted on the body portion which is swingable in one direction to clamp beneath the lip of the container and swingable in the opposite direction to unclamp. The valve is received on the body portion of the clamp and is rotatable in the unclamping direction of the lever to seal against the container top. This relation prevents loosening of the clamp during sealing of the valve end against the container top, and is considered an important improvement especially where the assembly is used with pressurized containers.

The body portion of the clamp in the embodiment disclosed has an upwardly extending eccentric cam and a downwardly extending skirt portion adapted to be received beneath the radial lip of the container. The cam lever is pivotally received on the eccentric stem of the body portion and has a radially extending arm, including an inwardly extending lip which is adapted to be locked beneath the container lip opposite the skirt portion. The valve body may be threadably received in the body portion, generally in the axis of the eccentric stem portion, and is provided with a sealing means at its lower end.

The valve assembly is secured to the container top by shifting the cam lever to the unlocked position, and unthreading the clamp from the valve, such that the valve body sealing means does not interfere with the clamp as it is received on the container top. The cam lever is then rotated to the lock position and the valve body is threaded downwardly to sealingly engage the container top. The valve body may now be threaded tightly against the container top to assure sealing, because turning of the valve body will tend to tighten the clamp, which will be explained more fully in the detailed description of the drawings which follows.

In the embodiment of the invention disclosed, the valve assembly includes a piercing member designed to tap a pressurized container and allow the gases to pass through the sealed communication between the valve member and the container top into the valve body. The valve stem may be reversely threaded to seal this communication, permitting partial usage of the container. For this reason, it is important that the clamp provide a positive lock on the container top, and the seal is sufficient to prevent leakage during storage.

Other advantages and meritorious features of this invention will more fully appear from the following specification, claims and accompanying drawings, wherein:

Figure 1:
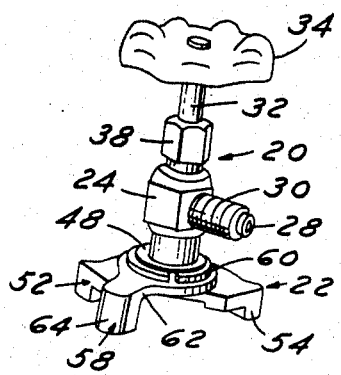
FIGURE 1 is a perspective view of one embodiment of the valve and clamp assembly of this invention.
Figure 4:
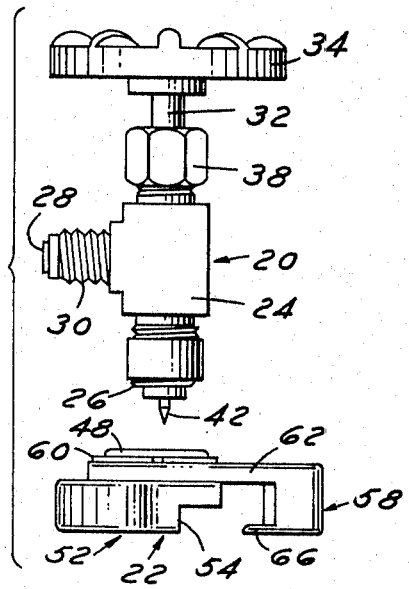
FIGURE 4 is a side exploded view of the valve and clamp assembly shown in FIGURE 1.
Figure 2:
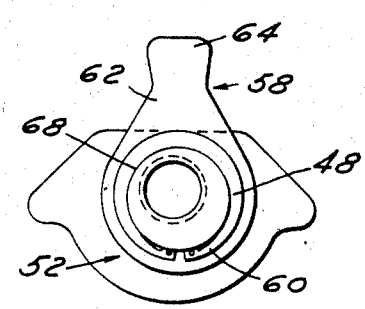
FIGURE 2 is a top view of the embodiment of the clamp assembly shown in FIGURE 1.

Referring particularly to FIGURES 1 and 4, the assembly includes a valve means shown generally at 20 and a clamp shown generally at 22.

Figure 7:
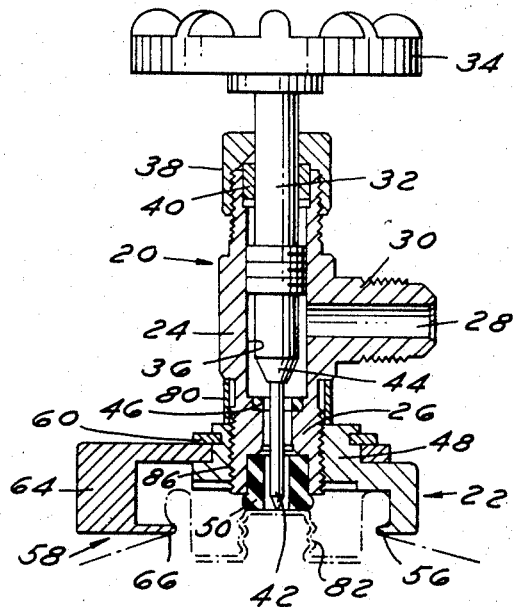
FIGURE 7 is a cross sectional side view of the assembly shown in FIGURE 6 with the valve body shifted to sealingly engage the container top.

The valve means includes a body portion 24, which provides sealed communication between the sealing end of the body portion 26 and a lateral port 28, as shown in FIGURE 7. A threaded nipple 30 may be provided to facilitate connection to a fluid line, not shown. A stem means 32 having a handle 34 is threadedly received in an axial chamber 36 defined in the body portion. A threaded nut 38 and an appropriate packing means 40 provides the seal between the end of the body portion and the stem 32. The end of the stem in this embodiment has a piercing member 42 which may be shifted axially by rotation of the handle 34. The end of the stem 44, adjacent the piercing member 42, seats against a sealing ring 46 to seal the communication between the end of the body portion 26 and the lateral port 28.

In the disclosed embodiment, the end of the valve means is threadably received in an eccentric stem portion 48 of the clamp, and the end of the body portion of the stem is provided with a sealing means 50 which may be shifted axially to engage the top of the container by threading the valve means in the clamp. The stem portion 48 has been characterized as "eccentric" herein because axis of the stem is not coincident with the axis of the skirt portion of the clamp.

Figure 3:
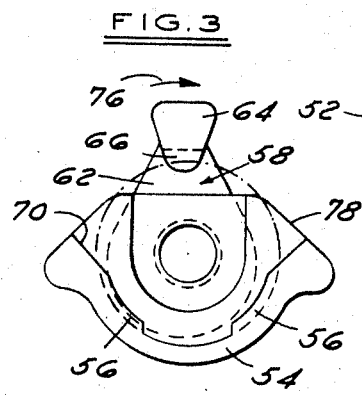
FIGURE 3 is a bottom view of the clamp assembly shown in FIGURES 1 and 2.

Referring more particularly to FIGURES 1 to 4, the clamp means 22 includes a body portion, referred to generally as 52, having an upwardly extending eccentric stem portion 48 and a downwardly extending skirt portion 54. The skirt portion is provided in this embodiment with a pair of radially extending lips 56, as shown in FIG. 3, which are adapted to be received beneath the radial lip on a container as shown in FIGURES 5 to 9. The lips 56 extend less than 90° about the circumference of the skirt portion to permit the clamp to be received on a radially extending lip on the container.

A cam lever 58 is pivotally received on the eccentric stem portion 48, and is retained to the body portion by a snap ring 60 or the like. The cam lever 58 is provided with a radially extending arm 62 which terminates in a hooked end 64, including a radially inwardly extending lip 66 adapted to be received beneath the container lip opposite the skirt portion 54.

Figure 5:
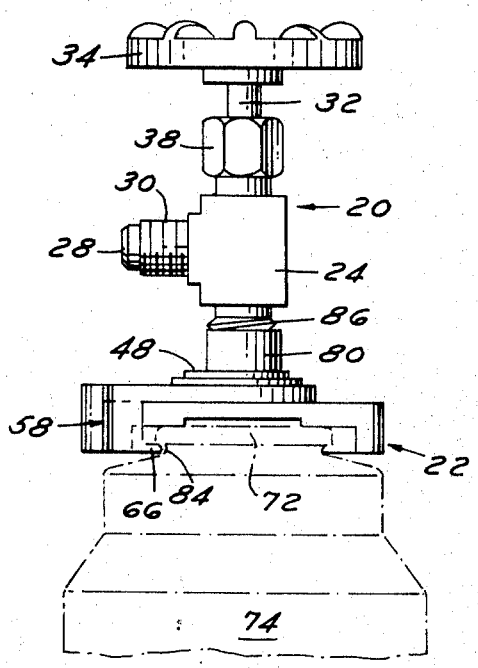
FIGURE 5 is a side view of the valve and clamp assembly of this invention loosely received on a container top.

The eccentric stem portion 48 permits pivotal movement of the cam lever furthest, relative to the axis of the skirt portion 54, opposite the edge 68 of the stem nearest the axis of the skirt portion; where the end 64 of the lever engages the skirt portion at 70, as shown in FIGURES 3. With the lever 58 in this position, referred to as the "unlocked position," the clamp may be received beneath the radial lip 72 of the container 74, as shown in FIGURE 5, without interference. When the cam lever is rotated in the opposite direction, as illustrated by arrow 76 in FIGURE 3, the end 64 defines an arc which extends generally toward the axis of the skirt portion, where the lever engages the body portion approximately at 78. In this position, the lever will prevent withdrawal of the clamp from the container. The function and operation of the clamp may best be described in relation to FIGURES 5 to 8.

Figure 9:
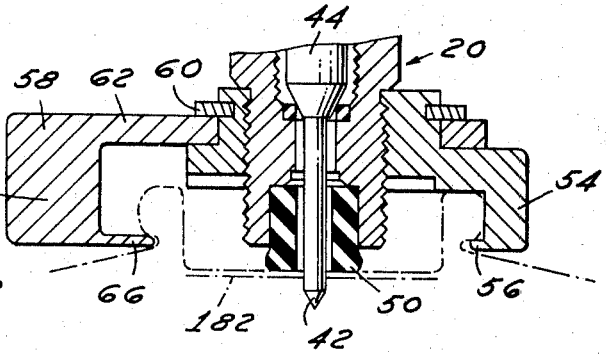
FIGURE 9 is similar to FIGURE 8 except that the container does not have an axially extending nipple portion.
Figure 8:
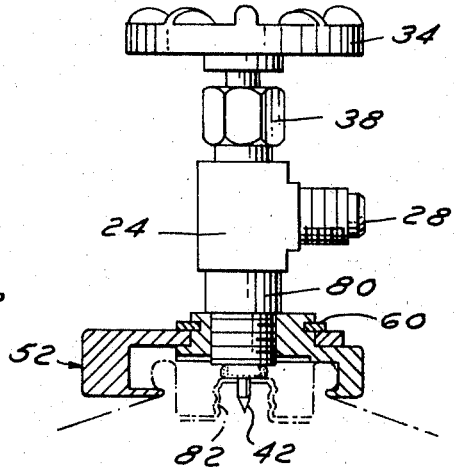
FIGURE 8 is a partially cross sectioned view, similar to FIGURE 7, with the valve assembly piercing means extending through the container top.

In FIGURE 5, the cam lever 58 has been rotated to the unlocked position and the valve means has been unthreaded from the clamp to a position where it does not interfere with receipt of the clamp on the container 74. A spacer ring 80 has been provided between the body portion 24 of the valve and the stem portion 48 of the clamp to compensate for the nipple 82 on the container top, as shown in FIGURES 7 and 8. This spacer may be removed where the container is not provided with a nipple, as shown in FIGURE 9. It can be seen from FIGURE 5 that the radially extending lip 66 of the cam lever is located beneath the radially extending lip 72 of the container, but is spaced radially from the opposing wall 84 of the container.

Figure 6:
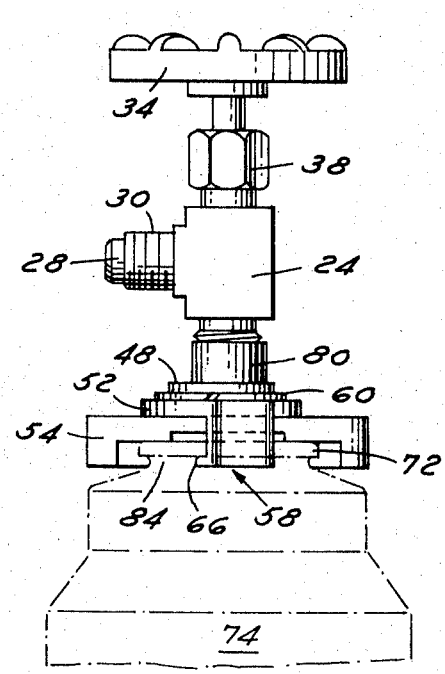
FIGURE 6 is similar to FIGURE 5 with the cam lever swung to the lock position.

In FIGURE 6, the lever has been rotated to the "locked position," wherein the radially extending lip 66 firmly engages the opposing container wall 84, beneath the container lip 72. As described hereinabove, the end of the lever defines an arc which extends generally toward the axis of the skirt portion as it is rotated from the unlocked position, urging the lip against the container wall. The "locked position" will vary somewhat with the diameter of the opposing container wall, but the clamp is designed such that the locked position is reached prior to a full swing of the lever, where it engages the body portion of the clamp. The clamp of this invention will thus compensate for variations in the diameter of the container, and it should be noted that the lever cannot be rotated past the locked position which is a considerable advantage over the eccentric lever clamps shown by the prior art. The clamp means of this invention thus provides a secure "one-way" locking engagement, and must be rotated all the way to the unlocked position to remove the clamp from the container. This is especially important in containers which contain a pressurized fluid, such as refrigerant gas, which will tend to blow the valve assembly from the container top if the connection is loose.

In FIGURE 7, the valve means 20 has been threadably rotated in the clamp 22 to axially shift the sealing means 50 against the container nipple 82, to provide a sealed communication between the container nipple and the lateral port 28. The spacer 80 limits the pressure which can be applied to the sealing means to prevent extrusion of the seal out of sealing engagement. The threads 86 on the valve means shift the clamp towards sealing engagement when the valve is rotated toward the "unlocked position" of the cam lever 58, or in the unlocking direction, tending thereby to tighten the cam as the end of the valve means is tightened against the container top. A cooperation is thus established between the valve means and the clamp to insure a secure locking of the clamp and sealing of the valve.

In FIGURE 8, the piercing member 42 has been shifted axially to pierce the top of the container nipple 82 and open the communication between the nipple and the lateral port of the valve 28. The piercing member shown by the clamps of the prior art generally includes a piercing tube, rather than a pointed member such as 42, and tend to plug under the pressure exerted from the fluid within the container. The piercing member is shifted axially by turning the handle 34, which threads the stem downwardly and pierces the container. After a portion of the container has been used, the container may be sealed by threading the end of the stem 44 against the sealing ring 46.

FIGURE 9 is identical to FIGURE 8 except the container top 182 is not provided with a nipple, such as shown at 82 in the preceding figures. Pressure containers, such as shown in the drawings, are provided with and wtihout a nipple, and the clamp and valve assembly of this invention is adapted to accommodate either type of container. The assembly is adapted to be used with the container of the type shown in FIGURE 9 simply by removing the spacer shown at 80 in the preceding drawings, which permits the valve body to be threaded until sealing engagement is achieved between the sealing means 50 and the container top, however other details of the assembly are identical.

What is claimed is:

1. A clamp, for connecting a valve body to the top of a container having a radially outwardly extending substantially fully circumferential lip, comprising: a body portion including a skirt portion and an upwardly extending stem portion having a substantially centrally located bore in relation to said skirt portion and an outer surface eccentric relative to said skirt portion, said bore being adapted to receive the valve body, said skirt portion having a downwardly extending portion and a radially inwardly extending lip portion adapted to be received beneath the radial lip of the container, and a cam lever pivotally received on said eccentric stem portion having a radially outwardly extending arm including a downwardly extending portion and a radially inwardly extending lip adapted to be locked beneath the container lip generally opposite said skirt portion upon rotational motion of said cam lever, and means for restricting axial movement of said cam lever on said eccentric stem portion relative to said skirt portion.

2. The clamp defined in claim 1, characterized in that a valve body is received in said stem portion and is rotatable to seal against the container top in a direction opposite to the direction of said arm in locking the clamp on the container.

3. The clamp defined in claim 2, characterized in that the sealing end of said valve body is generally coaxially aligned with said stem portion.

4. The clamp defined in claim 1, characterized in that said skirt portion is provided with a pair of radially inwardly extending lips adapted to be received beneath the container top.

5. The clamp defined in claim 1, characterized in that said body portion is provided with a pair of generally radially extending ears generally opposite the ends of said skirt portion permitting securement of the clamp with one hand by gripping one of said ears and the clamp lever and biasing the lever toward the ear.

6. A clamp for connecting a fluid line to a container having a generally circular radially outwardly extending lip, comprising: a body portion including an aperture therethrough, and stem means, and a skirt portion for engaging beneath the lip of the container, said skirt portion having a longitudinal axis, a clamp lever rotatably mounted on said stem means eccentric relative to said axis of said skirt portion, means for restricting axial movement of said lever on said stem means relative to said skirt portion, said lever including a radially outwardly extending portion and a depending lip portion adapted to be received beneath the lip of the container, and said lever rotatable in one direction to clamp beneath the lip of the container generally opposite said skirt portion and rotatable in the opposite direction to unclamp, said clamp provided with a stop means preventing unclamping of the lever in the first mentioned direction, and a fluid connecting member, said body portion and said member provided with co-acting connecting means, said connecting member including a sealing means received through said aperture in said body portion, said member being rotatable relative to said body portion in the second mentioned direction to seal against the container top thereby preventing loosening of the aforesaid clamp during sealing of the fluid connecting member against the container top.

7. The clamp defined in claim 6, characterized in that said stem means and said sealing means of said fluid connecting member are generally co-axially aligned.

References Cited

UNITED STATES PATENTS

| | | | |
|---|---|---|---|
| 1,164,553 | 12/1915 | Schnell | 215—86 |
| 2,875,777 | 3/1959 | Lacart | 137—318 |
| 2,893,603 | 7/1959 | Franck | 222—394 X |
| 3,092,291 | 6/1963 | Franck | 222—89 X |

FOREIGN PATENTS 554,743   3/1958   Canada.

CARL W. TOMLIN, *Primary Examiner.*

DAVE W. TOMLIN, *Assistant Examiner.*

U.S. Cl. X.R.

285—326, 358, 321, 312; 24—273; 222—325; 137—318